(12) United States Patent
Hotta

(10) Patent No.: US 9,670,831 B2
(45) Date of Patent: Jun. 6, 2017

(54) TEMPERATURE CONTROL APPARATUS FOR INTERCOOLER

(71) Applicant: TOYOTA JIDOSHA KABUSHIKI KAISHA, Toyota-shi, Aichi-ken (JP)

(72) Inventor: Shintaro Hotta, Shizuoka-ken (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 126 days.

(21) Appl. No.: 14/767,755

(22) PCT Filed: Feb. 6, 2014

(86) PCT No.: PCT/JP2014/052727
§ 371 (c)(1),
(2) Date: Aug. 13, 2015

(87) PCT Pub. No.: WO2014/125984
PCT Pub. Date: Aug. 21, 2014

(65) Prior Publication Data
US 2015/0369179 A1    Dec. 24, 2015

(30) Foreign Application Priority Data
Feb. 15, 2013 (JP) ................................ 2013-027377

(51) Int. Cl.
*F02B 29/04* (2006.01)
*B60W 10/08* (2006.01)
(Continued)

(52) U.S. Cl.
CPC ......... *F02B 29/0493* (2013.01); *B60W 10/08* (2013.01); *B60W 20/00* (2013.01);
(Continued)

(58) Field of Classification Search
CPC .... B60K 11/00–11/04; F01P 3/12; F01P 3/18; F01P 2003/182; F01P 2003/185;
(Continued)

(56) References Cited

U.S. PATENT DOCUMENTS 9,016,059 B2 * 4/2015 Lauberts ............. F02B 29/0412
60/599
2011/0284186 A1   11/2011 Hirai
2012/0090584 A1   4/2012 Jung

FOREIGN PATENT DOCUMENTS

JP   H10-23609 A    1/1998
JP   2009-144540 A  7/2009
(Continued)

*Primary Examiner* — Erick Solis
*Assistant Examiner* — Robert Werner
(74) *Attorney, Agent, or Firm* — Andrews Kurth Kenyon LLP

(57) ABSTRACT

Production of condensed water in an intercooler is suppressed. The apparatus comprises a high temperature system cooling water passage through which cooling water having a high temperature flows; a low temperature system cooling water passage which is a cooling water passage through which cooling water having a low temperature flows and which passes through at least the intercooler; two communication passages which communicate the high temperature system cooling water passage and the low temperature system cooling water passage, one of the communication passages through which the cooling water flows from the high temperature system cooling water passage toward the low temperature system cooling water passage, and the other through which the cooling water flows from the low temperature system cooling water passage toward the high temperature system cooling water passage; valves which are provided for the communication passages respectively; and a control unit which controls the valves provided for the communication passages respectively so that a temperature (Continued)

of the gas flowing out from the intercooler is higher than a dew point temperature.

7 Claims, 6 Drawing Sheets

(51) Int. Cl.
*B60W 20/00* (2016.01)
*F01P 3/08* (2006.01)
*F01P 3/10* (2006.01)
*F01P 7/16* (2006.01)
*F02B 37/00* (2006.01)
*F02B 39/00* (2006.01)
*F02D 41/00* (2006.01)
*F02M 26/04* (2016.01)
*F02M 26/22* (2016.01)
*F02M 26/28* (2016.01)
*F02M 26/24* (2016.01)
*F02M 26/33* (2016.01)
*F02D 35/02* (2006.01)
*F01P 3/18* (2006.01)

(52) U.S. Cl.
CPC ...... *F01P 3/08* (2013.01); *F01P 3/10* (2013.01); *F01P 7/16* (2013.01); *F01P 7/165* (2013.01); *F02B 29/0412* (2013.01); *F02B 37/00* (2013.01); *F02B 39/00* (2013.01); *F02D 41/0007* (2013.01); *F02D 41/0065* (2013.01); *F02M 26/04* (2016.02); *F02M 26/22* (2016.02); *F02M 26/24* (2016.02); *F02M 26/28* (2016.02); *F02M 26/33* (2016.02); *F01P 2003/182* (2013.01); *F01P 2025/44* (2013.01); *F01P 2060/02* (2013.01); *F01P 2060/16* (2013.01); *F02D 35/027* (2013.01); *F02D 2041/0067* (2013.01); *Y02T 10/144* (2013.01); *Y02T 10/146* (2013.01)

(58) Field of Classification Search
CPC .... F01P 7/14; F01P 2007/143; F01P 2060/02; F01P 2060/12; F02M 26/22; F02M 26/24; F02M 26/28; F02M 26/32–26/34; F02M 31/02; F02M 31/04; F02M 31/042; F02M 31/10; F02M 31/20; F02M 31/205; F02B 29/04; F02B 29/0406; F02B 29/0412; F02B 29/0437; F02B 29/0443; F02B 29/0475; F02B 29/0493
USPC ......... 123/41.01–41.02, 41.29, 41.31, 41.44, 123/563, 568.12
See application file for complete search history.

(56) References Cited

FOREIGN PATENT DOCUMENTS

| | | |
|---|---|---|
| JP | 2010-096020 A | 4/2010 |
| JP | 2010-197005 A | 9/2010 |
| JP | 2011-190743 A | 9/2011 |
| JP | 2012-087779 A | 5/2012 |
| JP | 2012-132364 A | 7/2012 |
| JP | 2012-140868 A | 7/2012 |

* cited by examiner

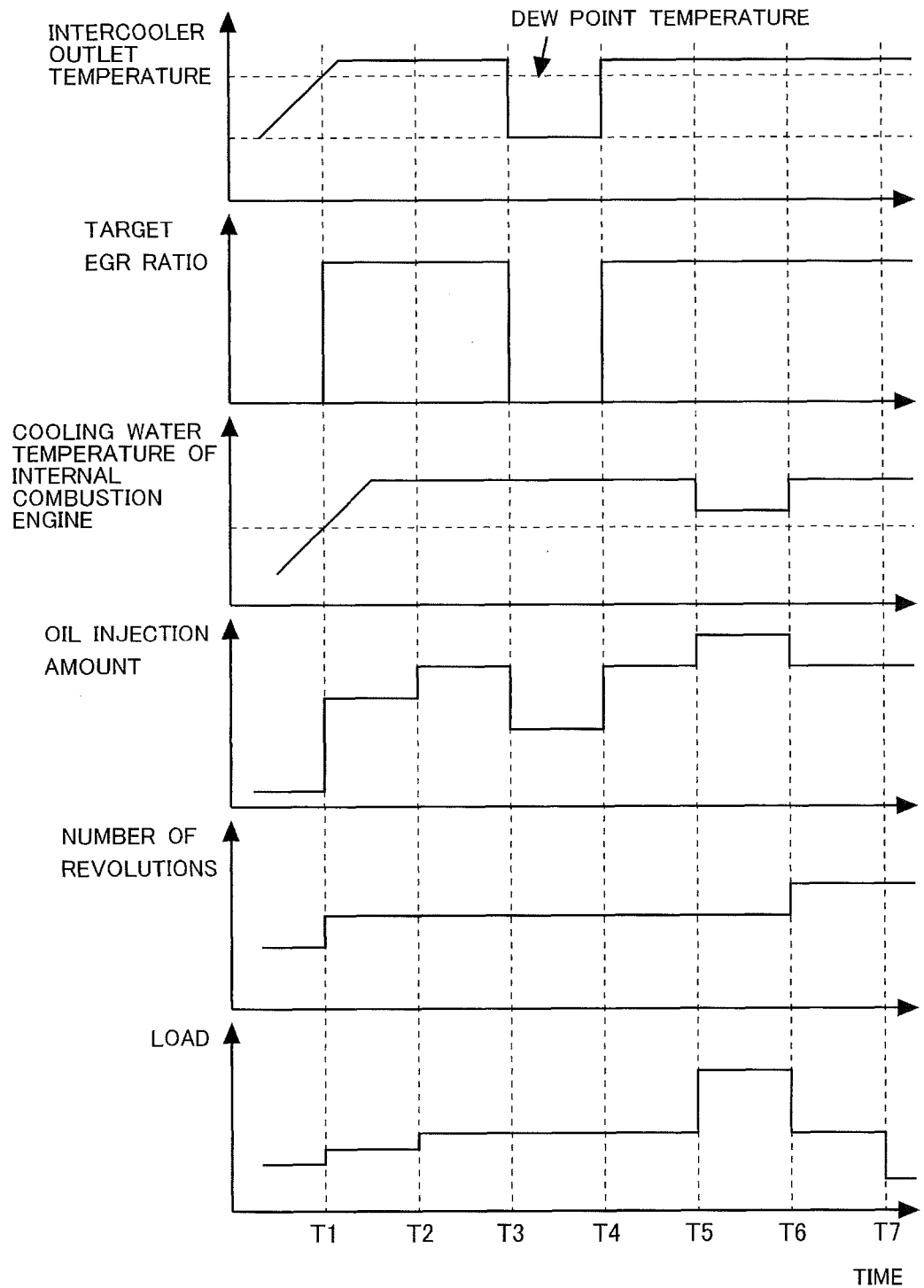

TEMPERATURE CONTROL APPARATUS FOR INTERCOOLER

CROSS-REFERENCE TO RELATED APPLICATIONS

This is a national phase application based on the PCT International Patent Application No. PCT/JP2014/052727 filed Feb. 6, 2014, claiming priority to Japanese Patent Application No. 2013-027377 filed Feb. 15, 2013, the entire contents of which are incorporated herein by reference.

TECHNICAL FIELD

The present invention relates to a temperature control apparatus for an intercooler.

BACKGROUND ART

A low pressure EGR apparatus is known, in which an exhaust gas passage disposed downstream from a turbine of a turbocharger is connected to an intake gas passage disposed upstream from a compressor of the turbocharger so that a part of the exhaust gas is supplied as the EGR gas. In the case of the low pressure EGR apparatus, the EGR gas passes through an intercooler. Therefore, the moisture content (water), which is contained in the EGR gas, is condensed in some cases when the EGR gas is cooled by the intercooler. If the condensed water, which is produced as described above, flows into a cylinder and adheres to a spark plug, then the spark is hardly generated, and the combustion state is deteriorated in some cases. Further, if a large amount of the condensed water flows into the cylinder, the so-called water hammer phenomenon occurs, in which the reciprocating motion of the piston is impeded. Further, if the condensed water is produced, it is feared that the intercooler may be corroded. Further, if unburned fuel or particulate matter contained in the EGR gas adheres to the condensed water, it is feared that the cooling efficiency of the intercooler may be lowered.

In relation thereto, it is known that the supply of the EGR gas from a low pressure EGR apparatus is stopped, assuming that the condensed water is produced if the downstream end temperature of an intercooler is less than a predetermined temperature and the boost pressure is less than a predetermined pressure (see, for example, Patent Literature 1).

Further, it is known that the flow rate of the intake gas of an intercooler is controlled so as not to exceed the limit relative humidity which is calculated on the basis of the vapor pressure of the intake gas provided at the outlet of an intercooler and the flow rate of the intake gas passing through the intercooler (see, for example, Patent Literature 2).

Furthermore, it is known that an EGR valve is closed if the cooling water, which flows through an intercooler, has the temperature that is less than a temperature at which it is feared that the condensed water may be frozen (see, for example, Patent Literature 3).

Moreover, it is known that the condensed water removal control, in which a pressure difference (differential pressure) is generated between one end side and the other end side of a condensed water removal passage to thereby allow the condensed water to flow out from the condensed water removal passage to an intake gas passage disposed on the side downstream from an intake gas adjusting valve, is executed, but the condensed water removal control is prohibited if an internal combustion engine is in the idle state (see, for example, Patent Literature 4).

Moreover, it is known that a discharge unit, which makes it possible to discharge the condensed water, is provided at a bottom portion of a complex type heat exchanger (see, for example, Patent Literature 5).

However, when the supply of the EGR gas is stopped, then the production of the condensed water can be suppressed, but it is impossible to supply the EGR gas. Therefore, it is feared that the fuel efficiency may be deteriorated and/or the discharge amount of NOx may be increased.

Further, if the structure of the intercooler is modified into such a structure that the condensed water is easily discharged, then it is feared that any limitation may arise when the intercooler is carried on a vehicle, and/or the cost may be raised due to the increase in the number of constitutive parts.

PRIOR ART LITERATURES

Patent Literatures

Patent Literature 1: Japanese Patent Application Laid-Open No. 2012-087779
Patent Literature 2: Japanese Patent Application Laid-Open No. 2012-132364
Patent Literature 3: Japanese Patent Application Laid-Open No. 2011-190743
Patent Literature 4: Japanese Patent Application Laid-Open No. 2012-140868
Patent Literature 5: Japanese Patent Application Laid-Open No. 2010-197005

SUMMARY OF THE INVENTION

Problems to be Solved by the Invention

The present invention has been made taking the foregoing problems into consideration, an object of which is to suppress production of condensed water in an intercooler.

Means for Solving the Problems

In order to achieve the object as described above, according to the present invention, there is provided a temperature control apparatus for an intercooler for an internal combustion engine, wherein, the internal combustion engine comprising:

a turbocharger which has a turbine provided for an exhaust gas passage and which has a compressor provided for an intake gas passage;

the intercooler which is provided for the intake gas passage downstream from the compressor and which performs heat exchange between cooling water and a gas flowing through the intake gas passage; and an EGR apparatus which is provided with an EGR passage for connecting the exhaust gas passage and the intake gas passage at a portion upstream from the intercooler and which supplies a part of an exhaust gas to the intake gas passage, the temperature control apparatus for the intercooler comprising:

a high temperature system cooling water passage which is one of two cooling water passages through each of which cooling water having different temperatures flows, and which is the cooling water passage through which cooling water having a temperature higher than that of the other flows;

a low temperature system cooling water passage which is one of the two cooling water passages through each of which cooling water having different temperatures flows, and which is the cooling water passage through which cooling water having a temperature lower than that of the high temperature system cooling water passage flows, and which passes through at least the intercooler;

two communication passages which communicate the high temperature system cooling water passage and the low temperature system cooling water passage, one of the communication passages through which the cooling water flows from the high temperature system cooling water passage toward the low temperature system cooling water passage, and the other through which the cooling water flows from the low temperature system cooling water passage toward the high temperature system cooling water passage;

valves which are provided for the communication passages respectively; and a control unit configured to control the valves provided for the communication passages respectively so that a temperature of the gas flowing out from the intercooler becomes higher than a dew point temperature.

In this context, the internal combustion engine is sometimes provided with two lines or systems of cooling water passages of the high temperature system cooling water passage through which the cooling water having the relatively high temperature flows and the low temperature system cooling water passage through which the cooling water having the relatively low temperature flows. For example, as for the intercooler, it is possible to raise the charging efficiency by performing the cooling with the cooling water having the relatively low temperature. However, if the temperature of the intercooler is excessively lowered, the condensed water is produced in the intercooler.

In relation thereto, when the temperature of the gas flowing out from the intercooler is higher than the dew point temperature, it is possible to suppress the production of the condensed water in the intercooler. Note that the temperature of the gas flowing out from the intercooler may be the temperature in the intercooler or the outlet temperature of the intercooler.

Then, in order to raise the temperature of the gas flowing out from the intercooler, the cooling water (hereinafter referred to as "high temperature system cooling water"), which flows through the high temperature system cooling water passage, is introduced into the low temperature system cooling water passage. Accordingly, the high temperature system cooling water is mixed with the cooling water (hereinafter referred to as "low temperature system cooling water") which flows through the low temperature system cooling water passage, and thus the temperature of the low temperature system cooling water is raised. Accordingly, the temperature of the intercooler is raised, and hence it is possible to suppress the production of the condensed water.

In this context, if the temperature of the gas flowing out from the intercooler is higher than the dew point temperature, it is considered that the production of the condensed water can be suppressed. Further, when both of the valves provided for the communication passages respectively are opened, then the cooling water thereby flows from the high temperature system cooling water passage toward the low temperature system cooling water passage in one communication passage, and the cooling water flows from the low temperature system cooling water passage toward the high temperature system cooling water passage in the other communication passage. Therefore, the temperature in the low temperature system cooling water passage is raised, and the temperature in the high temperature system cooling water passage is lowered. Then, the respective valves are controlled so that the temperature of the gas flowing out from the intercooler is higher than the dew point temperature, and thus it is possible to suppress the production of the condensed water.

In the present invention, if any knocking occurs in the internal combustion engine on account of the temperature of the gas flowing out from the intercooler raised to be higher than the dew point temperature, the control unit can control the temperature of the gas flowing out from the intercooler so that the temperature of the gas flowing out from the intercooler is not more than the dew point temperature within a range in which an amount of production of condensed water is not more than a prescribed amount.

In this context, it is feared that the knocking may occur in the cylinder on account of the raised temperature of the gas flowing out from the intercooler. In such a situation, the temperature of the gas flowing out from the intercooler may be not more than the dew point temperature, while giving the priority to the suppression of the occurrence of the knocking, rather than the suppression of the production of the condensed water. However, the temperature of the gas flowing out from the intercooler is adjusted so that the amount of the condensed water existing in the intercooler is not more than a prescribed amount. The prescribed amount can be the amount of the condensed water at which any problem including, for example, the deterioration of the combustion state and the water hammer is not caused if the prescribed amount of the condensed water flows into the cylinder at once. Accordingly, it is possible to suppress the occurrence of the knocking, and it is possible to suppress the occurrence of the problem caused by the condensed water even when the condensed water is produced.

In the present invention, if any knocking occurs in the internal combustion engine on account of the temperature of the gas flowing out from the intercooler raised to be higher than the dew point temperature, the control unit can increase an injection amount of an oil jet for injecting an oil toward a piston, as compared with if the knocking does not occur.

When the injection amount of the oil jet is increased, it is thereby possible to cool the piston. Accordingly, it is possible to suppress the occurrence of the knocking.

In the present invention, if any knocking occurs in the internal combustion engine on account of the temperature of the gas flowing out from the intercooler raised to be higher than the dew point temperature, the control unit can increase an amount of the cooling water flowing through the internal combustion engine, as compared with if the knocking does not occur.

When the amount of the cooling water flowing through the internal combustion engine is increased, it is thereby possible to lower the temperature around the cylinder of the internal combustion engine. Accordingly, it is possible to suppress the occurrence of the knocking. Note that any one of the high temperature system cooling water and the low temperature system cooling water may be allowed to flow through the internal combustion engine.

In the present invention, an electric motor, which changes a load of the internal combustion engine, is provided, and if any knocking occurs in the internal combustion engine on account of the temperature of the gas flowing out from the intercooler raised to be higher than the dew point temperature, the control unit can control the electric motor so that the load of the internal combustion engine is decreased, as compared with if the knocking does not occur.

In the case of a hybrid vehicle or the like provided with the electric motor, the load of the internal combustion engine can be changed by means of the electric motor. For example, if the knocking occurs, then the electric motor is operated so that the load of the internal combustion engine is decreased, and thus it is possible to suppress the occurrence of the knocking.

In the present invention, the temperature control apparatus for the intercooler may include:

a pump which discharges the cooling water in the low temperature system cooling water passage;

another apparatus through which the low temperature system cooling water passage passes and which is different from the intercooler; and a valve which is provided for the low temperature system cooling water passage between the pump and the intercooler, wherein:

the low temperature system cooling water passage is branched into a plurality of low temperature system cooling water passages on the downstream side from the pump, one of the branched low temperature system cooling water passages passes through the intercooler, and, the low temperature system cooling water passage, which is another one of the branched low temperature system cooling water passages and which is different from the low temperature system cooling water passage passing through the intercooler, passes through the another apparatus;

the valve, which is provided for the low temperature system cooling water passage, is provided between a portion at which the low temperature system cooling water passage is branched and the intercooler; and if the cooling water is allowed to flow through the another apparatus, the control unit operates the pump, and the control unit controls at least either of the valves provided for the communication passages respectively or the valve provided for the low temperature system cooling water passage so that the temperature of the gas flowing out from the intercooler becomes higher than the dew point temperature.

The another apparatus is, for example, the turbocharger. However, there is no limitation thereto. If the pump is operated to circulate the low temperature system cooling water when it is necessary to cool the another apparatus, then the low temperature system cooling water also circulates through the intercooler, and hence it is feared that the condensed water may be produced. In relation thereto, if the cooling water is allowed to circulate through the another apparatus, it is also appropriate that the circulation of the cooling water through the intercooler is restricted. For example, the valve, which is provided for the low temperature system cooling water passage, may be closed so that the cooling water does not circulate through the intercooler. Alternatively, the opening degree of the valve provided for the low temperature system cooling water passage may be decreased so that the amount of the cooling water circulating through the intercooler is decreased. Further, when the cooling water is allowed to circulate through the intercooler, then the temperature of the cooling water is adjusted so that the temperature of the gas flowing out from the intercooler is higher than the dew point temperature, and thus it is possible to suppress the production of the condensed water.

In the present invention, the another apparatus may be the turbocharger; and if it is requested to cool the turbocharger, the control unit can operate the pump to flow the cooling water through the turbocharger.

The turbocharger may have a high temperature, and hence the cooling water may be circulated in some cases in order to cool the turbocharger. Then, if the low temperature system cooling water is circulated through the turbocharger when it is necessary to cool the turbocharger, then the low temperature system cooling water also circulates through the intercooler, and hence it is feared that the condensed water may be produced. In this situation, the production of the condensed water can be suppressed by controlling at least one of the valves provided for the communication passages respectively and the valve provided for the low temperature system cooling water passage so that the temperature of the gas flowing out from the intercooler is higher than the dew point temperature.

In the present invention, if a temperature of a predetermined member of the turbocharger is not less than a predetermined temperature, the control unit can judge that it is requested to cool the turbocharger.

For example, if the temperature of the turbocharger is raised to such an extent that the oil is carbonized in the turbocharger, it is necessary to cool the turbocharger. Further, for example, when the intake air amount is small during the idle operation of the internal combustion engine, the circulation of the low temperature system cooling water is stopped. However, if the circulation is stopped for a long time, it is feared that the cooling water may boil in the turbocharger. Therefore, it is necessary to cool the turbocharger. In the circumstances as described above, if the low temperature system cooling water is circulated through the turbocharger, the low temperature system cooling water is also circulated through the intercooler. Therefore, it is feared that the condensed water may be produced. In relation thereto, the production of the condensed water can be suppressed by controlling at least one of the valves provided for the communication passages respectively and the valve provided for the low temperature system cooling water passage so that the temperature of the gas flowing out from the intercooler is higher than the dew point temperature. Note that any one of a housing of the turbocharger, a seal member of the turbocharger, and a rotating shaft of the turbocharger may be designated as the predetermined member. Further, the temperature at which the oil in the turbocharger is carbonized or the temperature at which it is feared that the oil in the turbocharger may be carbonized may be designated as the predetermined temperature. Further, the temperature at which the cooling water in the turbocharger boils or the temperature at which it is feared that the cooling water in the turbocharger may boil may be designated as the predetermined temperature.

In the present invention, the control unit can judge whether or not it is requested to cool the turbocharger after stop of the internal combustion engine.

When the internal combustion engine is stopped, the circulation of the cooling water through the turbocharger is stopped. In this situation, it is feared that the oil may be carbonized around the seal member of the rotating shaft of the turbocharger. That is, it is feared that the oil may be carbonized even after the stop of the internal combustion engine. In relation thereto, if it is requested to cool the turbocharger even after the stop of the internal combustion engine, it is possible to suppress the carbonization of the oil by circulating the cooling water.

In the present invention, the control unit can judge, every time when a predetermined time elapses, that it is requested to cool the turbocharger.

The pump is operated every time when a predetermined time elapses, in order to suppress the boiling of the cooling water and/or suppress the carbonization of the oil. In such a situation, if the low temperature system cooling water is circulated through the turbocharger, the low temperature system cooling water is also circulated through the intercooler. Therefore, it is feared that the condensed water may be produced. In relation thereto, it is possible to suppress the production of the condensed water by controlling at least one of the valves provided for the communication passages respectively and the valve provided for the low temperature system cooling water passage so that the temperature of the gas flowing out from the intercooler is higher than the dew point temperature. Note that the predetermined time can be a time which makes it possible to suppress the boiling of the cooling water or the carbonization of the oil.

In the present invention, if it is requested to cool the turbocharger, the control unit can decrease an opening degree of the valve provided for the low temperature system cooling water passage, as compared with if it is not requested to cool the turbocharger.

It is possible to decrease the amount of the low temperature system cooling water flowing through the intercooler, by decreasing the opening degree of the valve provided for the low temperature system cooling water passage. Accordingly, it is possible to suppress the occurrence of such a situation that the temperature of the gas flowing out from the intercooler is lower than the dew point temperature. Further, it is possible to increase the amount of the low temperature system cooling water flowing through the another apparatus, by decreasing the amount of the low temperature system cooling water flowing through the intercooler. Therefore, it is possible to effectively cool the another apparatus. Note that the decreasing of the opening degree of the valve provided for the low temperature system cooling water passage can include fully closing the valve.

In the present invention, the apparatus may include:

a pump which discharges the cooling water in the low temperature system cooling water passage, wherein:

if the temperature of the gas flowing out from the intercooler is not more than the dew point temperature, the control unit can stop the pump before controlling the valves provided for the communication passages respectively so that the temperature of the gas flowing out from the intercooler becomes higher than the dew point temperature, and if the temperature of the gas flowing out from the intercooler is not more than the dew point temperature after a predetermined time elapses after stopping the pump, the control unit can control the valves provided for the communication passages respectively so that the temperature of the gas flowing out from the intercooler becomes higher than the dew point temperature.

When the pump is stopped, then the cooling water, which exists in the intercooler, stays in the intercooler thereby, and the temperature of the cooling water is raised as the heat exchange with the intake gas advances. Accordingly, it is possible to suppress the production of the condensed water. Note that there are also a case in which the temperature of the gas flowing out from the intercooler is not higher than the dew point temperature even when the pump is stopped and a case in which a time is required to raise the temperature to be higher than the dew point temperature. Therefore, the high temperature system cooling water is introduced into the low temperature system cooling water passage after the predetermined time elapses. The predetermined time is set within a range in which no problem occurs in relation to the amount of production of the condensed water.

Advantageous Effect of the Invention

According to the present invention, it is possible to suppress the production of the condensed water in the intercooler.

BRIEF DESCRIPTION OF THE DRAWINGS

FIG. 7 shows a time chart illustrating the transition of the outlet temperature of the intercooler, the target EGR ratio, the temperature of cooling water in the internal combustion engine, the oil injection amount from an oil jet, the number of revolutions of the engine, and the engine load provided when the control according to the embodiment of the present invention is carried out.

EMBODIMENTS FOR CARRYING OUT THE INVENTION

An explanation will be made in detail below by way of example with reference to the drawings on the basis of an embodiment about a mode for carrying out the present invention. However, for example, the dimension or size, the material, the shape, and the relative arrangement of each of constitutive parts or components described in the embodiment of the present invention are not intended to limit the scope of the invention only thereto unless specifically noted.

First Embodiment

Figure 1:
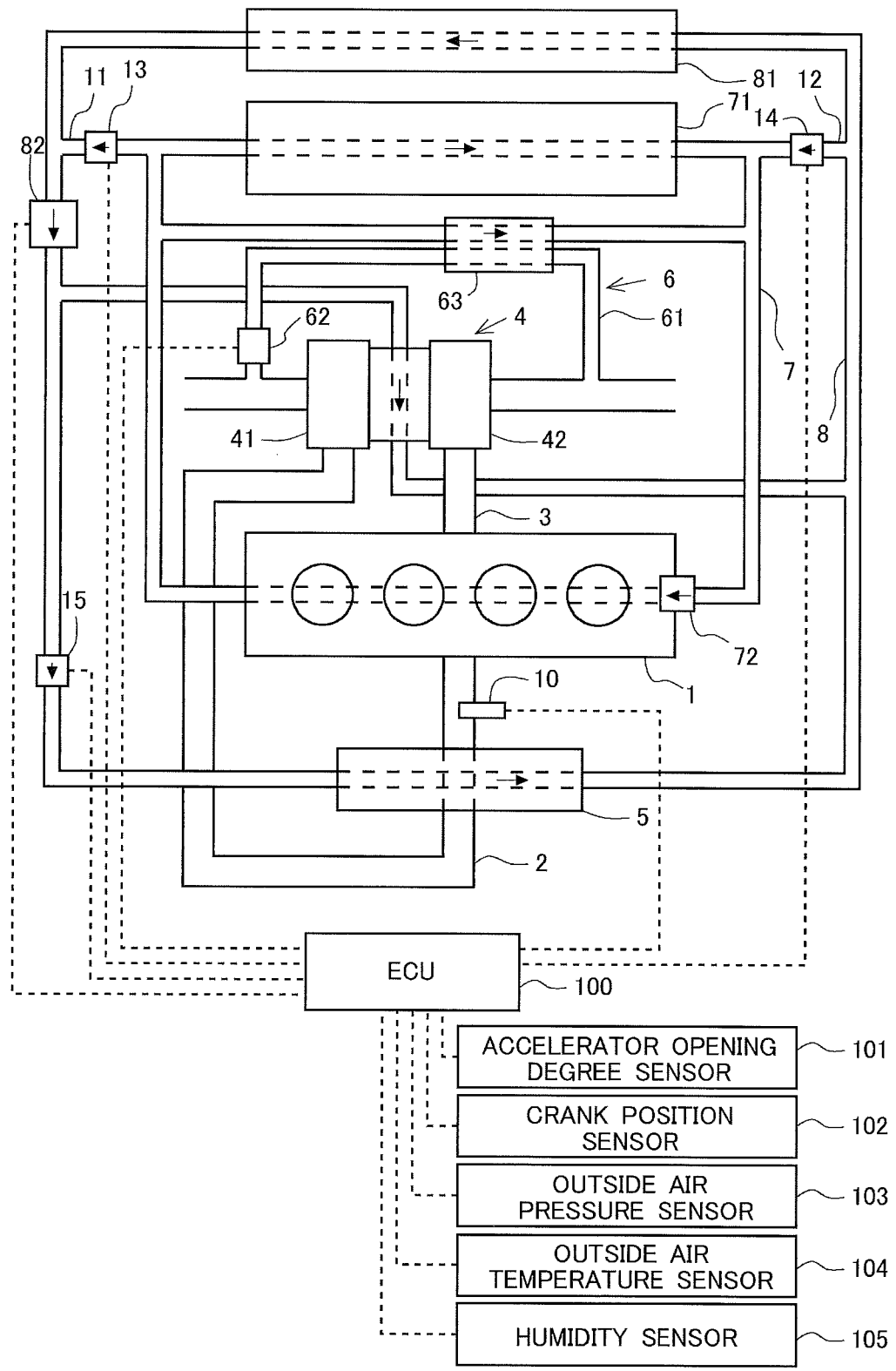
FIG. 1 shows a schematic arrangement of an internal combustion engine according to an embodiment.

FIG. 1 shows a schematic arrangement of an internal combustion engine according to this embodiment. The internal combustion engine 1 shown in FIG. 1 may be either a gasoline engine or a diesel engine.

An intake gas passage (intake air passage) 2 and an exhaust gas passage 3 are connected to the internal combustion engine 1. A compressor 41 of a turbocharger 4 is provided at an intermediate portion of the intake gas passage 2. An intercooler 5, which performs the heat exchange between the intake gas (intake air) and the cooling water, is provided for the intake gas passage 2 downstream from the compressor 41. Further, a turbine 42 of the turbocharger 4 is provided at an intermediate portion of the exhaust gas passage 3.

Further, an EGR apparatus 6, which supplies a part of the exhaust gas as the EGR gas to the intake gas passage 2, is provided for the internal combustion engine 1. The EGR apparatus 6 is constructed to include an EGR passage 61 which connects the exhaust gas passage 3 at a portion disposed downstream from the turbine 42 and the intake gas passage 2 at a portion disposed upstream from the compressor 41, an EGR valve 62 which changes the passage area (areal size) of the EGR passage 61, and an EGR cooler 63 which lowers the temperature of the EGR gas.

Note that the EGR passage 61 may be connected to the intake gas passage 2 at a portion disposed downstream from the compressor 41, provided that the portion is disposed upstream from the intercooler 5. Further, the EGR passage 61 may be connected to the exhaust gas passage 3 disposed at a portion upstream from the turbine 42.

Further, in this embodiment, there are provided a high temperature system cooling water passage 7 through which the cooling water having a relatively high temperature (for example, 90° C.) circulates and a low temperature system cooling water passage 8 through which the cooling water having a relatively low temperature (for example, 45° C.) circulates.

The high temperature system cooling water passage 7 is connected to the internal combustion engine 1, and the cooling water (hereinafter referred to as "high temperature system cooling water"), which circulates through the high temperature system cooling water passage 7, circulates through the internal combustion engine 1. Further, a high temperature system radiator 71, which performs the heat exchange between the high temperature system cooling water and the outside air, is provided at an intermediate portion of the high temperature system cooling water passage 7. A pump 72, which discharges the cooling water, is provided at the inlet of the internal combustion engine 1 at an intermediate portion of the high temperature system cooling water passage 7. The pump 72 acquires the driving force from an output shaft of the internal combustion engine 1, and the pump 72 discharges the high temperature system cooling water to the inside of the internal combustion engine 1. Then, the high temperature system cooling water, which has passed through the inside of the internal combustion engine 1, circulates through the high temperature system cooling water passage 7. Note that the high temperature system cooling water passage 7 is also connected to the EGR cooler 63, and the high temperature system cooling water circulates through the EGR cooler 63. Further, the high temperature system cooling water may also circulate through a heater for raising the temperature of the air in a vehicle cabin. The apparatus, through which the high temperature system cooling water circulates, may be arranged in parallel or arranged in series along with the high temperature system cooling water passage 7.

On the other hand, the low temperature system cooling water passage 8 is connected to the intercooler 5 and the turbocharger 4. The cooling water (hereinafter referred to as "low temperature system cooling water"), which circulates through the low temperature system cooling water passage 8, circulates through the intercooler 5 and the turbocharger 4. Further, a low temperature system radiator 81, which performs the heat exchange between the low temperature system cooling water and the outside air, is provided at an intermediate portion of the low temperature system cooling water passage 8. That is, the intake gas is cooled by performing the heat exchange with respect to the low temperature system cooling water in the intercooler 5. Further, the turbocharger 4 is cooled by the low temperature system cooling water. An electric pump 82 is provided at an intermediate portion of the low temperature system cooling water passage 8. When the electric power is applied, the electric pump 82 discharges the low temperature system cooling water to circulate the low temperature system cooling water through the low temperature system cooling water passage 8.

The low temperature system cooling water passage 8 is branched into two on the downstream side from the electric pump 82. One low temperature system cooling water passage 8 after being branched passes through the intercooler 5, and the other low temperature system cooling water passage 8 passes through the turbocharger 4. That is, the electric pump 82 is provided for the low temperature system cooling water passage 8 at the portion disposed between the outlet of the low temperature system radiator 81, and the inlet of the intercooler 5 and the inlet of the turbocharger 4. The low temperature system cooling water is discharged toward the intercooler 5 and the turbocharger 4. Further, the low temperature system cooling water passages 8 merge at a portion disposed downstream from the intercooler 5 and the turbocharger 4. After that, the low temperature system cooling water passage 8 passes through the low temperature system radiator 81.

Further, in this embodiment, a first communication passage 11 is provided, which communicates a portion of the high temperature system cooling water passage 7 disposed between the outlet of the internal combustion engine 1 and the inlet of the high temperature system radiator 71 and a portion of the low temperature system cooling water passage 8 disposed between the outlet of the low temperature system radiator 81 and the inlet of the electric pump 82. Further, a second communication passage 12 is provided, which communicates a portion of the high temperature system cooling water passage 7 disposed between the outlet of the high temperature system radiator 71 and the inlet of the pump 72 and a portion of the low temperature system cooling water passage 8 disposed between the outlet of the intercooler 5 and the inlet of the low temperature system radiator 81. A first valve 13, which opens/closes the first communication passage 11, is provided at an intermediate portion of the first communication passage 11. Further, a second valve 14, which opens/closes the second communication passage 12, is provided at an intermediate portion of the second communication passage 12. Further, a third valve 15, which opens/closes the low temperature system cooling water passage 8, is provided for the low temperature system cooling water passage 8 on the outlet side of the electric pump 82 on the side of the intercooler 5 as compared with a branched portion of the low temperature system cooling water passage 8 directed to the turbocharger 4 and the low temperature system cooling water passage 8 directed to the intercooler 5. Each of the first valve 13, the second valve 14, and the third valve 15 may be either a valve which can be merely fully opened or fully closed, or a valve which can maintain an arbitrary opening degree. Note that the arrows, which are depicted on the respective apparatuses or devices, show the directions of the flow of the cooling water.

Note that an intake gas temperature sensor 10, which detects the temperature of the intake gas flowing through the intake gas passage 2, is provided for the intake gas passage 2 at a portion downstream from the intercooler 5. It is also allowable to consider that the temperature, which is detected by the intake gas temperature sensor 10, is the temperature of the gas flowing out from the intercooler 5, the outlet temperature of the intercooler 5, or the temperature in the intercooler 5.

Further, ECU 100, which is an electronic control unit for controlling the internal combustion engine 1, is provided in combination with the internal combustion engine 1. ECU 100 controls the internal combustion engine 1 in accordance with the operation condition of the internal combustion engine 1 and the request of the driver.

Other than the sensor as described above, those connected to ECU 100 via electric wirings are an accelerator opening degree sensor 101 which outputs an electric signal corresponding to a pedaling amount of an accelerator pedal and which makes it possible to detect the engine load, a crank position sensor 102 which detects the number of revolutions of the engine, an outside air pressure sensor 103 which detects the pressure of the atmospheric air, an outside air temperature sensor 104 which detects the temperature of the atmospheric air, and a humidity sensor 105 which detects the humidity of the atmospheric air. Outputs of these sensors are inputted into ECU 100. On the other hand, the EGR valve 62, the electric pump 82, the first valve 13, the second valve 14, and the third valve 15 are connected to ECU 100 via electric wirings. These devices are controlled by ECU 100.

When the internal combustion engine 1 is operated in a state in which ECU 100 closes the first valve 13 and the second valve 14, the pump 72 is operated in cooperation with the output shaft of the internal combustion engine 1. The pump 72 discharges the high temperature system cooling water toward the inside of the internal combustion engine 1. The high temperature system cooling water, which flows out from the internal combustion engine 1, flows through the high temperature system cooling water passage 7. The high temperature system cooling water passage 7 is branched at the intermediate portion. The high temperature system cooling water flows through the high temperature system radiator 71 and the EGR cooler 63.

Further, when ECU 100 operates the electric pump 82 in a state in which ECU 100 closes the first valve 13 and the second valve 14, the low temperature system cooling water is discharged from the electric pump 82. The low temperature system cooling water passage 8 is branched on the downstream side from the electric pump 82. Therefore, the low temperature system cooling water flows through the turbocharger 4 and the intercooler 5. When ECU 100 closes the third valve 15, it is possible to shut off the flow of the low temperature system cooling water directed to the intercooler 5. Further, it is possible to adjust the amount of the cooling water flowing through the intercooler 5 by adjusting the opening degree of the third valve 15.

Further, when ECU 100 opens the first valve 13 and the second valve 14, then the high temperature system cooling water flows through the first communication passage 11 from the high temperature system cooling water passage 7 toward the low temperature system cooling water passage 8, and the low temperature system cooling water flows through the second communication passage 12 from the low temperature system cooling water passage 8 toward the high temperature system cooling water passage 7. Therefore, the temperature of the cooling water existing in the high temperature system cooling water passage 7 is lowered, and the temperature of the cooling water existing in the low temperature system cooling water passage 8 is raised.

Then, ECU 100 controls the respective apparatuses and devices so that the production of the condensed water in the intercooler 5 is suppressed. In this context, the condensed water is easily produced in the intercooler 5 if the operation state of the internal combustion engine 1 resides in the low rotation and the high load, the EGR gas is supplied by the EGR apparatus 6, and the intake air amount is small. In such a situation, if the supply of the EGR gas is stopped in order to suppress the production of the condensed water, then the fuel efficiency (fuel consumption) is consequently deteriorated, and/or the NOx exhaust amount is consequently increased. Therefore, in this embodiment, the production of the condensed water is suppressed, while continuing the supply of the EGR gas. Note that the production of the condensed water can be also suppressed in any other operation state.

Accordingly, ECU 100 maintains the temperature of the gas flowing out from the intercooler 5 (hereinafter referred to as "outlet temperature of the intercooler 5" as well) at a temperature higher than the dew point temperature. Specifically, the dew point temperature, which is provided when the EGR gas is supplied, is calculated on the basis of the outside air temperature, the outside air humidity, the outside air pressure, and the target EGR ratio. Note that the dew point temperature may be detected by a sensor. Then, the temperature of the cooling water circulating through the intercooler 5 is adjusted so that the outlet temperature of the intercooler 5, which is detected by the intake gas temperature sensor 10, is higher than the dew point temperature.

In order to maintain the outlet temperature of the intercooler 5 at the temperature higher than the dew point temperature, for example, it is conceived that the circulation of the cooling water through the intercooler 5 is stopped. In this case, it is appropriate that the third valve 15, which is provided for the low temperature system cooling water passage 8, is closed, or the electric pump 82 is stopped. Accordingly, the temperature of the cooling water in the intercooler 5 is gradually raised in accordance with the heat exchange between the intake gas and the cooling water. Then, the heat, which is deprived from the intake gas in the intercooler 5, is gradually decreased. In this way, it is possible to raise the outlet temperature of the intercooler 5. Therefore, it is possible to maintain the outlet temperature of the intercooler 5 at the temperature higher than the dew point temperature.

Further, in order to maintain the outlet temperature of the intercooler 5 at the temperature higher than the dew point temperature, it is conceived that the high temperature system cooling water is introduced into the low temperature system cooling water passage 8. In this context, the temperature of the cooling water circulating through the intercooler 5 is relatively low in a state in which the first valve 13 provided at the intermediate portion of the first communication passage 11 and the second valve 14 provided at the intermediate portion of the second communication passage 12 are closed. On the other hand, when the first valve 13 provided at the intermediate portion of the first communication passage 11 and the second valve 14 provided at the intermediate portion of the second communication passage 12 are opened, then the high temperature system cooling water flows into the low temperature system cooling water passage 8 from the high temperature system cooling water passage 7 while passing through the first communication passage 11, and the low temperature system cooling water flows into the high temperature system cooling water passage 7 from the low temperature system cooling water passage 8 while passing through the second communication passage 12. That is, the high temperature system cooling water and the low temperature system cooling water are mixed with each other. Therefore, the temperature of the cooling water flowing through the low temperature system cooling water passage 8 is raised. When the cooling water having the raised temperature flows into the intercooler 5, the outlet temperature of the intercooler 5 is raised as well. Accordingly, it is possible to maintain the outlet temperature of the intercooler 5 at the temperature higher than the dew point temperature. Note that the outlet temperature of the intercooler 5 can be adjusted by adjusting, for example, the times for opening the first valve 13 and the second valve 14, the opening degrees of the first valve 13 and the second valve 14, the operation time of the electric pump 82, and the discharge amount of the cooling water from the electric pump 82.

Figure 2:
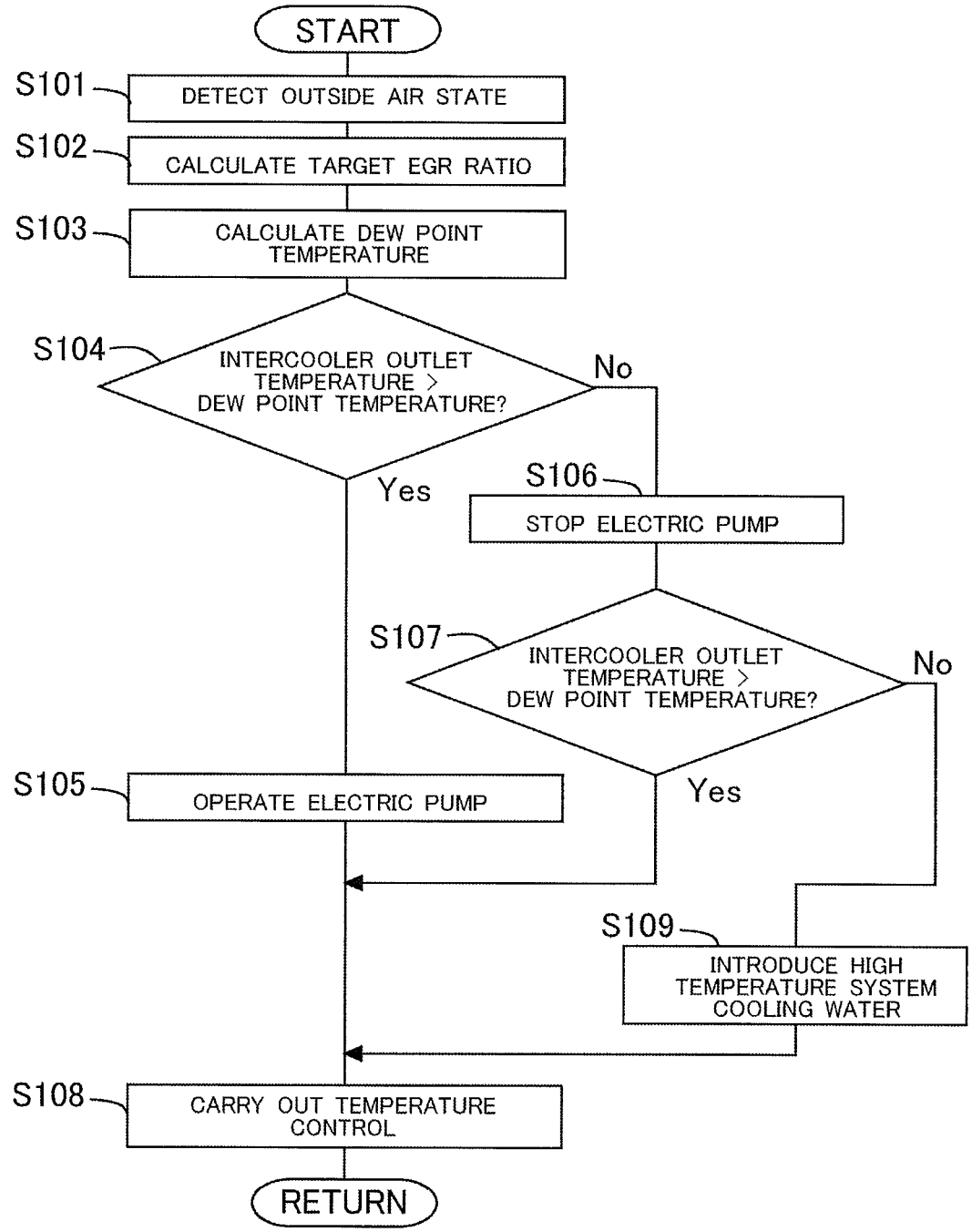
FIG. 2 shows a flow chart illustrating a flow to suppress the production of condensed water in an intercooler according to the embodiment.

FIG. 2 shows a flow chart illustrating a flow to suppress the production of condensed water in the intercooler 5 according to this embodiment. This routine is repeatedly executed by ECU 100 every time when a predetermined time elapses.

In Step S101, the state of the outside air is detected. In this step, the outside air pressure, the outside air temperature, and the outside air humidity, which are required to calculate the dew point temperature, are detected by the sensors.

In Step S102, the target EGR ratio is calculated. The target EGR ratio is calculated on the basis of the number of revolutions of the engine and the engine load. The relationship among the number of revolutions of the engine, the engine load, and the target EGR ratio is previously determined by means of any experiment or any simulation, and the relationship is stored in ECU 100.

In Step S103, the dew point temperature is calculated. In this case, the EGR gas is also contained in the gas which passes through the intercooler 5. The moisture content (water), which is produced by the combustion of fuel, is contained in the EGR gas. Therefore, the dew point temperature is calculated on the basis of the state of the outside air detected in Step S101 and the target EGR ratio calculated in Step S102. The method for calculating the dew point temperature is well-known, any explanation of which is omitted. Note that a sensor for detecting the dew point temperature may be provided, and the dew point temperature may be detected by the sensor. In this case, it is possible to omit the processes of Step S101 and Step S102.

In Step S104, it is judged whether or not the outlet temperature of the intercooler 5 is higher than the dew point temperature calculated in Step S103. In this step, it is judged whether or not such a state is given that the condensed water is not produced in the intercooler 5. The outlet temperature of the intercooler 5 is detected by the intake gas temperature sensor 10. Note that in order to provide a margin or allowance to some extent, it is also allowable to judge whether or not the outlet temperature of the intercooler 5 is not less than a predetermined temperature which is higher than the dew point temperature.

If the affirmative judgment is made in Step S104, then the routine proceeds to Step S105, and the electric pump 82 is operated. That is, the low temperature system cooling water flows through the intercooler 5. In this situation, the first valve 13 and the second valve 14 are closed, and the third valve 15 is open. Accordingly, when the intake gas passes through the intercooler 5, the temperature of the intake gas is lowered.

On the other hand, if the negative judgment is made in Step S104, then the routine proceeds to Step S106, and the electric pump 82 is stopped. In this situation, the first valve 13 and the second valve 14 are closed, and the third valve 15 is open. When the electric pump 82 is stopped, then the flow of the cooling water in the intercooler 5 is stopped thereby, and the temperature in the intercooler 5 is gradually raised by the heat of the intake gas. If the outlet temperature of the intercooler 5 is raised to be higher than the dew point temperature in accordance therewith, it is unnecessary to open the first valve 13 and the second valve 14. Therefore, the electric pump 82 is firstly stopped, and the situation is observed. Note that the electric pump 82 may be stopped, for example, for a predetermined time. The predetermined time is determined while considering the time required to raise the outlet temperature of the intercooler 5 and the amount of the produced condensed water. In this procedure, if the time to stop the electric pump 82 is long, a large amount of condensed water is produced in some cases until the outlet temperature of the intercooler 5 is raised, even when the outlet temperature of the intercooler 5 is raised. The predetermined time is determined as the time for which no problem is caused by the condensed water produced in such a situation.

In Step S107, it is judged whether or not the outlet temperature of the intercooler 5 is higher than the dew point temperature. That is, it is judged whether or not the outlet temperature of the intercooler 5 is raised to be higher than the dew point temperature on account of the stop of the electric pump 82.

If the affirmative judgment is made in Step S107, the routine proceeds to Step S108. On the other hand, if the negative judgment is made, the routine proceeds to Step S109.

In Step S108, the temperature control is carried out so that such a state is maintained that the outlet temperature of the intercooler 5 is higher than the dew point temperature. In this procedure, it is also allowable to control the first valve 13, the second valve 14, the third valve 15, and the electric pump 82 so that the outlet temperature of the intercooler 5 is a predetermined temperature which is higher than the dew point temperature. For example, the higher the outlet temperature of the intercooler 5 is, the more suppressed the production of the condensed water is. However, the charging efficiency is lowered thereby. Therefore, the predetermined temperature is a temperature which is not excessively high. For example, when the outlet temperature of the intercooler 5 is raised, the first valve 13, the second valve 14, and the third valve 15 are opened. When the outlet temperature of the intercooler 5 is lowered, then the first valve 13 and the second valve 14 are closed, and the third valve 15 is opened. Further, for example, when the outlet temperature of the intercooler 5 is raised, the opening degrees of the first valve 13 and the second valve 14 are increased in a state in which the third valve 15 is opened. When the outlet temperature of the intercooler 5 is lowered, the opening degrees of the first valve 13 and the second valve 14 are decreased in a state in which the third valve 15 is opened. Further, the more increased the discharge amount of the electric pump 82 is, the more facilitated the decrease in the temperature of the cooling water in the low temperature system radiator 81 is. Therefore, the outlet temperature of the intercooler 5 is lowered thereby.

In Step S109, the high temperature system cooling water is introduced into the low temperature system cooling water passage 8. That is, the first valve 13 and the second valve 14 are opened. In this situation, the third valve 15 is open. In this step, it is feared that the condensed water may be still produced even when the electric pump 82 is stopped. Therefore, the temperature in the intercooler 5 is actively raised by introducing the high temperature system cooling water. In this situation, it is also allowable to operate the electric pump 82. Note that if the negative judgment is made in Step S104, it is also allowable to carry out Step S109 without carrying out Step S106 and Step S107. That is, if the outlet temperature of the intercooler is not more than the dew point temperature, it is also allowable to introduce the high temperature system cooling water into the low temperature system cooling water passage 8. Note that in this embodiment, ECU 100, which processes Step S109, corresponds to the control unit according to the present invention.

By the way, if the high temperature system cooling water is introduced into the low temperature system cooling water passage 8, then the outlet temperature of the intercooler 5 is raised, and hence the temperature of the intake gas of the internal combustion engine 1 is raised. Therefore, it is feared that any knocking may occur in the internal combustion engine 1. In relation thereto, when the knocking occurs, or when the operation is being performed in an operation area in which it is feared that the knocking may occur, then the production amount of the condensed water may be permitted until arrival at a prescribed amount to lower the temperature of the cooling water flowing through the intercooler 5. That is, it is also allowable that the amount of introduction of the high temperature system cooling water into the low temperature system cooling water passage 8 is decreased, or the introduction of the high temperature system cooling water into the low temperature system cooling water passage 8 is not performed until the production amount of the condensed water arrives at the prescribed amount.

The prescribed amount is set as the amount of the condensed water at which no problem occurs even when the condensed water existing in the intercooler 5 flows into the cylinder at once. For example, if the condensed water adheres to the spark plug, then the spark is hardly generated, and the combustion state is deteriorated in some cases. Further, if a large amount of the condensed water flows into the cylinder, the so-called water hammer phenomenon, in which the reciprocating motion of the piston is impeded, is caused in some cases. The prescribed amount is set as the upper limit value of the amount of the condensed water at which the phenomenon as described above is not caused. The prescribed amount can be previously determined, for example, by means of any experiment or any simulation.

Note that the amount of the actually produced condensed water may be detected or estimated, and the value thereof may be compared with the prescribed amount. However, it is also allowable to previously determine at what degree of the outlet temperature of the intercooler the amount of production of the condensed water is not more than the prescribed amount, for example, by means of any experiment or any simulation while being correlated with the state of the outside air and/or the target EGR ratio. Further, a sensor, which detects the water level in the intercooler 5, may be provided to adjust the amount of the high temperature system cooling water to be introduced into the low temperature system cooling water passage 8 so that the amount of the condensed water, which is calculated on the basis of the detection value of the sensor, is not more than the prescribed amount. Further, for example, the time, which is required until the production amount of the condensed water becomes the prescribed amount after the outlet temperature of the intercooler 5 is not more than the dew point temperature, may be previously determined, for example, by means of any experiment or any simulation while being correlated with the state of the outside air and/or the operation state of the internal combustion engine 1.

Further, when the knocking occurs in the internal combustion engine 1, or when the operation is being performed in an operation area in which it is feared that the knocking may occur, then it is also allowable to carry out another control to suppress the occurrence of the knocking. For example, the wall surface temperature of the combustion chamber may be lowered by increasing the amount of the cooling water circulating through the internal combustion engine 1. Accordingly, it is possible to suppress the occurrence of the knocking. Further, the temperature of the piston may be lowered by increasing the injection amount of the oil jet for injecting the oil toward the piston. It is also possible to suppress the occurrence of the knocking thereby. Further, the load of on the internal combustion engine 1 may be changed. For example, in the case of a hybrid vehicle provided with an electric motor, it is possible to adjust the load of the internal combustion engine 1 by means of the electric motor. Then, the occurrence of the knocking can be suppressed by operating the electric motor so that the load of the internal combustion engine 1 is lowered. All of the control procedures to suppress the occurrence of the knocking as described above may be performed. Alternatively, any one or more of the control procedures may be perform.

As described above, when the knocking occurs or when it is feared that the knocking may occur by introducing the high temperature system cooling water into the low temperature system cooling water passage 8, then the control to suppress the occurrence of the knocking may be carried out. Further, even if the high temperature system cooling water is not introduced into the low temperature system cooling water passage 8, when the knocking occurs or when it is feared that the knocking may occur, then the control to suppress the occurrence of the knocking may be carried out.

Figure 3:
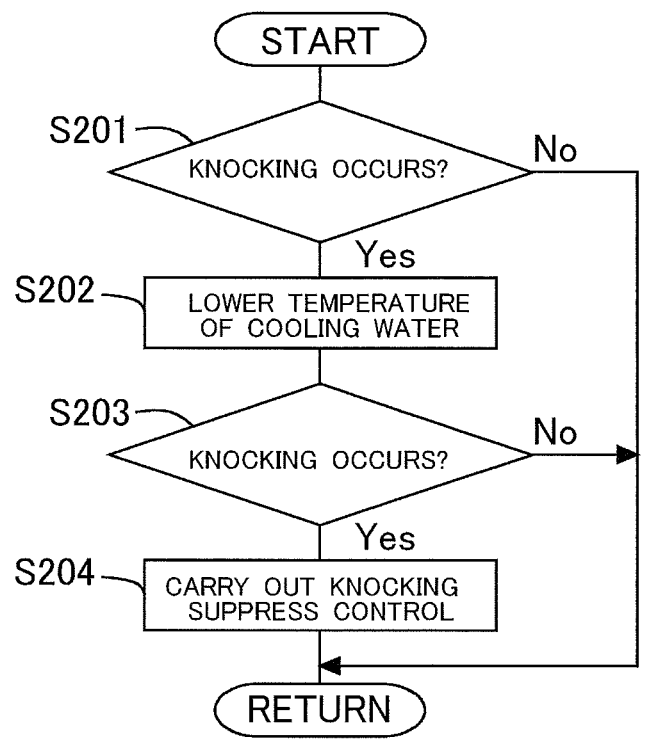
FIG. 3 shows a flow chart illustrating a flow to suppress the occurrence of knocking.

FIG. 3 shows a flow chart illustrating a flow to suppress the occurrence of the knocking. This routine is repeatedly executed by ECU 100 every time when a predetermined time elapses. Note that this routine may be executed continuously after the termination of the routine shown in FIG. 2.

In Step S201, it is judged whether or not the knocking occurs in the internal combustion engine 1. For example, a sensor for detecting the knocking is attached to the internal combustion engine 1 to detect the occurrence of the knocking. If the affirmative judgment is made in Step S201, the routine proceeds to Step S202. On the other hand, if the negative judgment is made, this routine is terminated.

In Step S202, the temperature of the cooling water circulating through the intercooler 5 is lowered within a range in which the amount of the condensed water produced in the intercooler 5 is not more than the prescribed amount. That is, the outlet temperature of the intercooler 5 is not more than the dew point temperature. In this case, the condensed water is produced in the intercooler 5. However, the outlet temperature of the intercooler 5 is adjusted so that the amount of the condensed water existing in the intercooler 5 is not more than the prescribed amount.

In order to lower the temperature of the cooling water circulating through the intercooler 5, the first valve 13 and the second valve 14 are closed, and the third valve 15 is opened. Further, it is also appropriate to decrease the amount of the cooling water flowing through the first communication passage 11 and the second communication passage 12 by decreasing the opening degrees of the first valve 13 and the second valve 14. Also in this case, the third valve 15 is opened. Then, when the amount of production of the condensed water arrives at the prescribed amount, then the first valve 13 and the second valve 14 are opened, and thus the temperature of the cooling water circulating through the intercooler 5 is raised.

In Step S203, it is judged whether or not the knocking occurs in the internal combustion engine 1. That is, the occurrence of the knocking is suppressed by performing the process of Step S202. However, it is also assumed that the knocking still occurs. Therefore, it is judged again whether or not the knocking occurs. If the affirmative judgment is made in Step S203, the routine proceeds to Step S204. On the other hand, if the negative judgment is made, this routine is terminated.

In Step S204, the control is carried out to suppress the occurrence of the knocking. That is, even when the temperature of the cooling water flowing through the intercooler 5 is adjusted, it is impossible to suppress the occurrence of the knocking. Therefore, the occurrence of the knocking is suppressed by means of another means. For example, the injection amount of the oil jet for injecting the oil toward the piston is increased. Further, the flow rate of the high temperature system cooling water circulating through the internal combustion engine 1 is increased. In this case, the pump 72 is provided such that the discharge amount can be changed. Further, the load of the internal combustion engine 1 is lowered. For example, in the case of a hybrid vehicle, the internal combustion engine 1 is assisted by an electric motor, and thus the load of the internal combustion engine 1 is lowered. Note that in this step, it is also possible to use any other well-known means to suppress the occurrence of the knocking.

By the way, the cooling water also circulates through the turbocharger 4. Therefore, the flow rate or the temperature of the cooling water is controlled in some cases in accordance with the state of the turbocharger 4. For example, if the internal combustion engine 1 is stopped when the temperature of the turbocharger 4 is high, then the circulation of the cooling water through the turbocharger 4 is stopped. In this situation, it is feared that the oil may be carbonized around a seal member of the rotating shaft of the turbocharger 4. The seal member is a member to effect the sealing so that the oil, which is provided to lubricate the rotating shaft of the turbocharger 4, does not leak to the outside. Further, in order to suppress the carbonization of the oil, the electric pump 82 is operated in some cases during the period in which the internal combustion engine 1 is stopped.

In this context, the temperature of the oil, which is provided around the rotating shaft of the turbocharger 4 when the internal combustion engine 1 is stopped, closely relates to the temperature of the seal member. Therefore, it is possible to judge whether or not the oil is carbonized on the basis of the temperature of the seal member. Further, the temperature of the seal member relates to the temperature of a housing of the turbocharger 4. Therefore, the temperature of the seal member can be estimated from the temperature of the housing of the turbocharger 4. Note that the temperature of the seal member may be detected by means of a sensor for detecting the temperature of the seal member. Further, the temperature of the housing of the turbocharger 4 may be detected by means of a sensor. However, the temperature of the housing of the turbocharger 4 can be also estimated from the number of revolutions of the engine and the engine load. Any well-known technique can be used to estimate the temperature of the housing from the number of revolutions of the engine and the engine load. Further, the relationship among the number of revolutions of the engine, the engine load, and the temperature of the housing of the turbocharger 4 may be previously determined, for example, by means of an experiment, and the relationship may be mapped. Then, it is possible to judge that it is feared that the oil may be carbonized if the temperature of the seal member is not less than a threshold value. If it is judged that it is feared that the oil may be carbonized, the electric pump 82 is operated. The threshold value of the temperature of the seal member is previously determined as the temperature at which it is feared that the oil may be carbonized, by means of any experiment or any simulation, and the threshold value is stored in ECU 100.

Further, the electric pump 82 may be operated during the period in which the temperature of the seal member is not less than the threshold value. The time, for which the electric pump 82 is to be operated, may be determined in accordance with the temperature of the seal member provided at the point in time at which the operation of the electric pump 82 is started.

Figure 4:
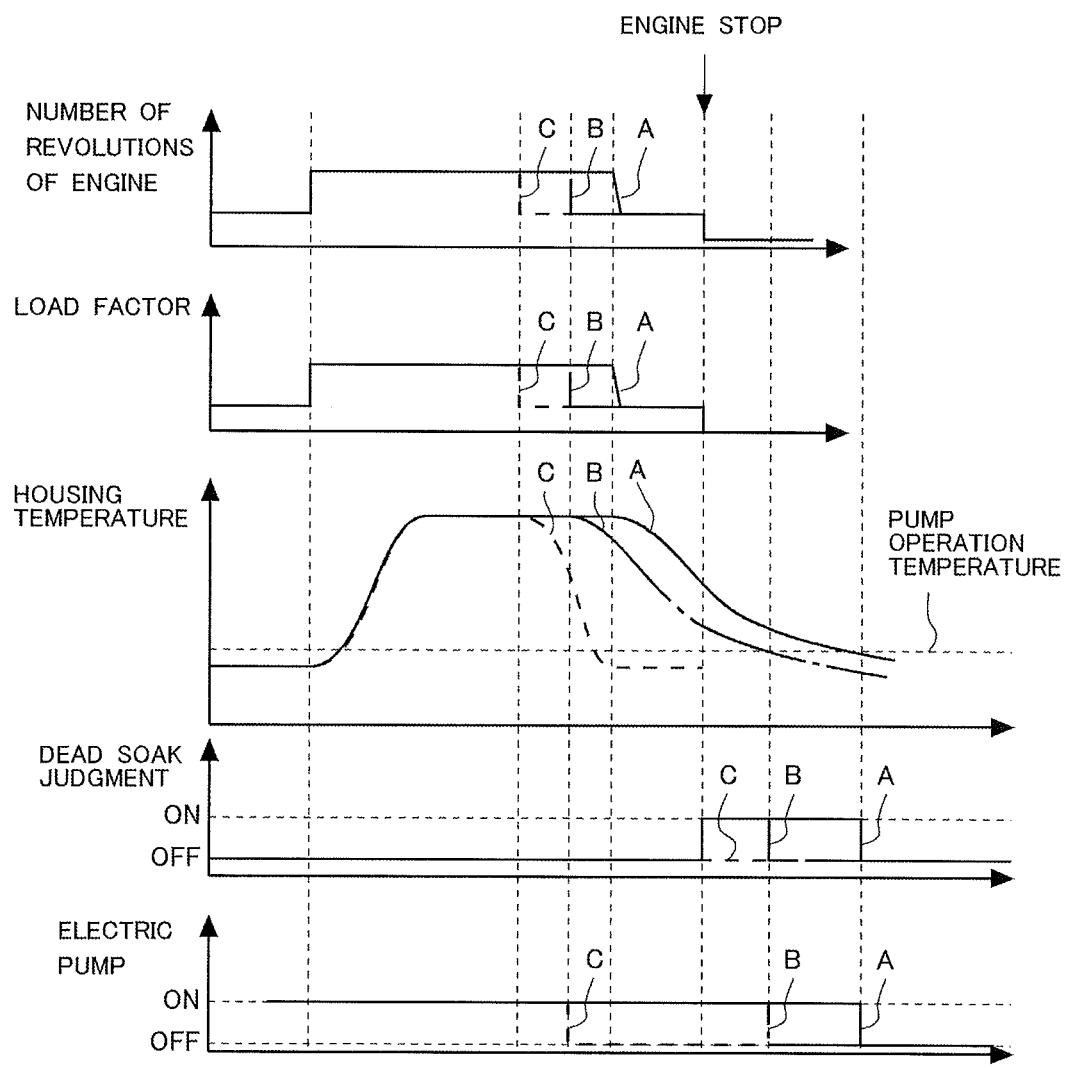
FIG. 4 shows a time chart illustrating the transition of various values provided when an electric pump is operated after the stop of the engine.

In the meantime, FIG. 4 shows a time chart illustrating the transition of various values provided when the electric pump 82 is operated after the stop of the engine. Those shown are the number of revolutions of the engine, the load factor of the internal combustion engine 1, the temperature of the housing of the turbocharger 4, the state of the dead soak judgment, and the operation state of the electric pump 82 in this order as referred to from the top. In the dead soak judgment, it is judged whether or not it is necessary to operate the electric pump 82 after the stop of the engine. If the state of the dead soak judgment is ON, it is assumed to be necessary to operate the electric pump 82. If the state of the dead soak judgment is OFF, it is assumed to be unnecessary to operate the electric pump 82. With reference to FIG. 4, A (solid line) shows such a case that the period, in which the state of the high number of revolutions of the engine and the high load factor is continued, is the longest. B (alternate long and short dash line) shows such a case that the period, in which the state of the high number of revolutions of the engine and the high load factor is continued, is at a moderate level. C (broken line) shows such a case that the period, in which the state of the high number of revolutions of the engine and the high load factor is continued, is the shortest.

When the engine is stopped, in the case of C, the temperature of the housing has been already sufficiently lowered, and the temperature of the housing is lower than the pump operation temperature. Therefore, in the case of C, the state of the dead soak judgment is OFF from the point in time at which the engine is stopped. Further, in the case of C, the temperature of the housing is lower than the pump operation temperature from the point in time at which the engine is operated, and the electric pump 82 is stopped from the point in time at which the engine is operated (before the engine stop). Further, in the case of B, the temperature of the housing is higher than the pump operation temperature at the point in time at which the engine is stopped. Therefore, the state of the dead soak judgment is ON, and the electric pump 82 is operated even after the engine stop. Then, in the case of A, the temperature of the housing, which is provided at the point in time of the engine stop, is further raised to be higher than that provided in the case of B. The electric pump 82 is operated even after the engine stop. Then, the operation time of the electric pump 82 is the longest in the case of A in which the temperature of the housing is the highest at the point in time of the engine stop. The operation time of the electric pump 82 may be determined depending on the temperature of the housing provided at the point in time of the engine stop. Further, if the temperature of the housing provided after the engine stop is lower than the pump operation temperature, the electric pump 82 may be stopped.

Figure 5:
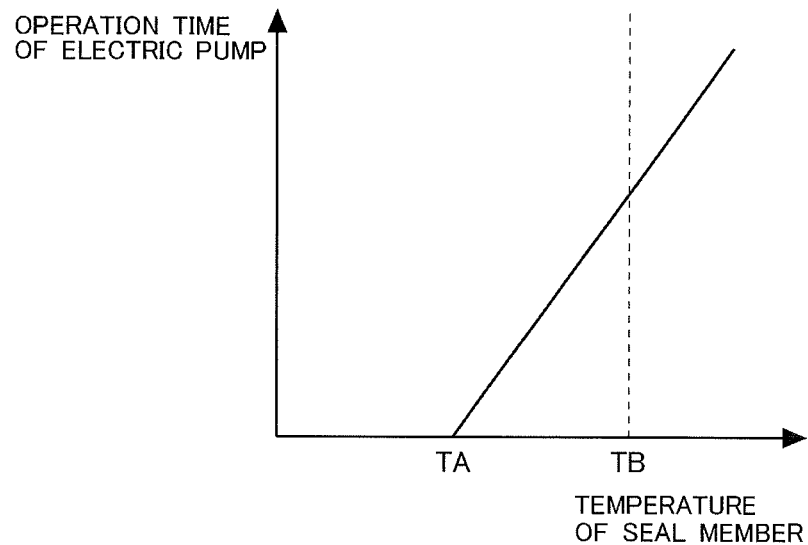
FIG. 5 shows a relationship between the temperature of a seal member and the time for operating the electric pump after the stop of the internal combustion engine.

FIG. 5 shows a relationship between the temperature of the seal member and the time for operating the electric pump 82 after the stop of the internal combustion engine 1. The electric pump 82 is operated when the temperature of the seal member is not less than the threshold value TA. Further, the higher the temperature of the seal member provided upon the stop of the internal combustion engine 1 is, the longer the time for operating the electric pump 82 is. The threshold value TA is set to a temperature which is lower than the temperature TB at which the oil is carbonized. The time for operating the electric pump 82 may be the time which is required until the temperature of the seal member is lowered to the threshold value. This relationship is determined, for example, by means of any experiment or any simulation, and the relationship is stored in ECU 100.

Further, the temperatures of the respective members are hardly raised when the intake air amount is small during the idle operation of the internal combustion engine 1. Therefore, the electric pump 82 is stopped in some cases. However, if the electric pump 82 is stopped for a long time, then the temperature of the turbocharger 4 is raised, and it is feared that the cooling water may boil in the turbocharger 4. In order to suppress the boiling of the cooling water as described above, the electric pump 82 is periodically operated in some cases. The interval for operating the electric pump 82 is previously determined, for example, by means of any experiment or any simulation. Further, the electric pump 82 may be operated if the temperature of the housing of the turbocharger 4 is not less than a threshold value.

In this context, as shown in FIG. 1, the low temperature system cooling water circulates through the turbocharger 4. Therefore, if the flow rate and the temperature of the cooling water circulating through the turbocharger 4 are changed, the flow rate and the temperature of the cooling water circulating through the intercooler 5 may be also changed. Therefore, if it is intended to lower the temperature of the turbocharger 4, then the outlet temperature of the intercooler 5 is also lowered, and it is feared that the outlet temperature of the intercooler 5 may be not more than the dew point temperature. Therefore, in this embodiment, the control is carried out to suppress the production of the condensed water in the intercooler 5 when the temperature of the turbocharger 4 is lowered.

Figure 6:
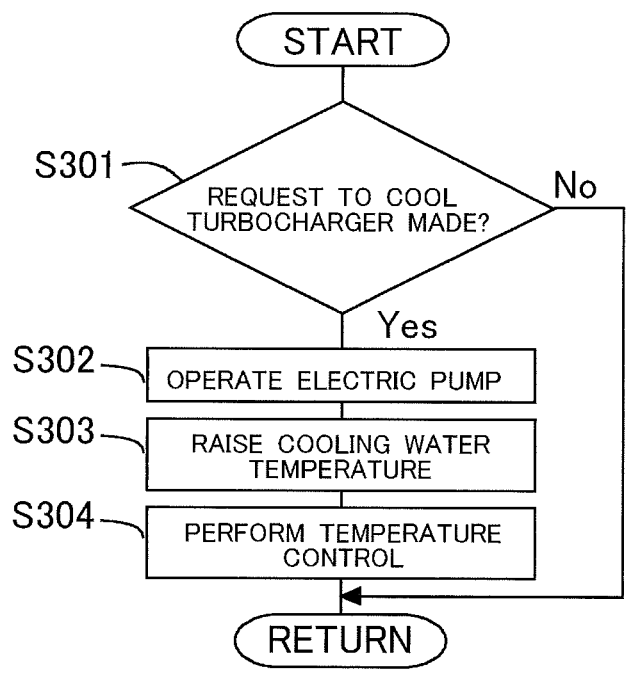
FIG. 6 shows a flow chart illustrating a flow to suppress such a situation that any condensed water is produced in the intercooler when the temperature of a turbocharger is lowered.

FIG. 6 shows a flow chart illustrating a flow to suppress such a situation that any condensed water is produced in the intercooler 5 when the temperature of the turbocharger 4 is lowered. This routine is repeatedly executed by ECU 100 every time when a predetermined time elapses. Note that this routine may be executed continuously after the termination of the routine shown in FIG. 2 or after the termination of the routine shown in FIG. 3.

In Step S301, it is judged whether or not a request is made to cool the turbocharger 4. In this step, it is judged whether or not it is necessary to operate the electric pump 82. Further, in this step, it is also allowable to judge whether or not it is necessary to increase the discharge amount of the electric pump 82. For example, it is also allowable to judge whether or not the temperature of the seal member of the turbocharger 4 is not less than the threshold value. Further, if the electric pump 82 is periodically operated, it is also allowable to judge whether or not the timing to operate the electric pump 82 comes. If the affirmative judgment is made in Step S301, the routine proceeds to Step S302. On the other hand, if the negative judgment is made, this routine is terminated.

In Step S302, the electric pump 82 is operated. Accordingly, the temperature of the turbocharger 4 is lowered. However, the outlet temperature of the intercooler 5 is also lowered.

In Step S303, the high temperature system cooling water is introduced into the turbocharger 4 by opening the first valve 13 and the second valve 14. That is, the temperature of the cooling water flowing through the low temperature system cooling water passage 8 is raied. Note that in this procedure, the outlet temperature of the intercooler 5 may be suppressed from being lowered by fully closing the third valve 15 provided for the low temperature system cooling water passage 8 or decreasing the opening degree thereof. That is, it is also allowable that the cooling water in the intercooler 5 does not flow even when the electric pump 82 is operated. Note that in this step, the opening degrees of the first valve 13 and the second valve 14 may be increased or the opening degree of the third valve 15 may be decreased as compared with the case in which the negative judgment is made in Step S301.

In Step S304, the temperature control is carried out so that the state, in which the outlet temperature of the intercooler 5 is higher than the dew point temperature, is maintained. In this case, the first valve 13, the second valve 14, the third valve 15, and the electric pump 82 may be controlled so that the outlet temperature of the intercooler 5 becomes a predetermined temperature which is higher than the dew point temperature, in the same manner as in Step S108 described above. Further, the temperature in the intercooler 5 may be adjusted by adjusting the period for closing the third valve 15 provided for the low temperature system cooling water passage 8 or the opening degree when the third valve 15 is opened.

Note that in this embodiment, the electric pump 82 is operated in order to circulate the cooling water through the turbocharger 4. However, the present invention can be applied in the same manner even when the electric pump 82 is operated in order to cool another device or apparatus other than the turbocharger 4 and the intercooler 5.

FIG. 7 shows a time chart illustrating the transition of the outlet temperature of the intercooler 5, the target EGR ratio, the temperature of cooling water in the internal combustion engine 1, the oil injection amount from the oil jet, the number of revolutions of the engine, and the engine load provided when the control according to the embodiment of the present invention is carried out.

At the point in time of T1, the warming-up of the internal combustion engine 1 is completed, and the supply of the EGR gas is started. Further, at the point in time of T1, the injection of the oil is started from the oil jet. The first valve 13, the second valve 14, and the third valve 15 are controlled so that the outlet temperature of the intercooler 5 is not less than the dew point temperature (for example, 50° C.) after the point in time of T1. Then, the knocking occurs at the point in time of T2. The knocking occurs until the point in time of T7. That is, the knocking does not occur before the point in time of T2 and after the point in time of T7. Then, the oil injection amount from the oil jet is increased after the point in time of T2. That is, the oil injection amount, which is provided after the point in time of T2, is increased as compared with the oil injection amount which is provided during the period from T1 to T2. The higher the outlet temperature of the intercooler 5 is, the more increased the oil injection amount provided in this procedure may be.

The supply of the EGR gas is stopped during the period ranging from T3 to T4. When the supply of the EGR gas is stopped, then the amount of moisture content (water) passing through the intercooler 5 is decreased, and hence the dew point temperature is lowered. Therefore, the outlet temperature of the intercooler 5 is lowered. In this situation, the temperature of the intake gas is lowered, and the knocking hardly occurs. Therefore, it is also possible to decrease the oil injection amount from the oil jet.

Further, the load of the internal combustion engine 1 is raised during the period ranging from T5 to T6. In this case, the knocking easily occurs. Therefore, the occurrence of the knocking is suppressed by lowering the temperature of the cooling water for the internal combustion engine 1. However, the occurrence of the knocking cannot be suppressed. Therefore, at the point in time of T7, the load of on the internal combustion engine 1 is decreased by means of the electric motor, and the number of revolutions of the engine is raised. Accordingly, the knocking does not occur after the point in time of T7.

As explained above, according to this embodiment, the outlet temperature of the intercooler 5 can be maintained at the temperature higher than the dew point temperature. Therefore, it is possible to suppress the production of the condensed water in the intercooler 5.

Further, when the knocking occurs, the temperature of the cooling water is adjusted so that the amount of production of the condensed water is not more than the prescribed amount. Thus, it is possible to suppress, for example, the deterioration of the combustion state which would be otherwise caused by the condensed water, while suppressing the occurrence of the knocking. Further, it is possible to suppress the occurrence of the knocking by increasing the injection amount of the oil jet, increasing the flow rate of the cooling water circulating through the internal combustion engine 1, and/or reducing the load of the internal combustion engine 1.

Further, when it is requested to cool the turbocharger 4, then the amount of the cooling water circulating through the intercooler 5 is restricted, and thus it is possible to suppress the production of the condensed water in the intercooler 5, while cooling the turbocharger 4.

DESCRIPTION OF THE REFERENCE SIGNS

1: internal combustion engine
2: intake gas passage
3: exhaust gas passage
4: turbocharger
5: intercooler
6: EGR apparatus
7: high temperature system cooling water passage
8: low temperature system cooling water passage
10: intake gas temperature sensor
11: first communication passage
12: second communication passage
13: first valve
14: second valve
15: third valve
41: compressor
42: turbine
61: EGR passage
62: EGR valve
63: EGR cooler
71: high temperature system radiator
72: pump
81: low temperature system radiator
82: electric pump
100: ECU

The invention claimed is:

1. A temperature control apparatus for an intercooler for an internal combustion engine, wherein, the internal combustion engine comprising:
   a turbocharger which has a turbine provided for an exhaust gas passage and which has a compressor provided for an intake gas passage;
   the intercooler which is provided for the intake gas passage downstream from the compressor and which performs heat exchange between cooling water and a gas flowing through the intake gas passage; and
   an EGR apparatus which is provided with an EGR passage for connecting the exhaust gas passage and the intake gas passage at a portion upstream from the intercooler and which supplies a part of an exhaust gas to the intake gas passage, the temperature control apparatus for the intercooler comprising:
   a high temperature system cooling water passage which is one of two cooling water passages through each of which cooling water having different temperatures flows, and which is the cooling water passage through which cooling water having a temperature higher than that of the other flows;
   a low temperature system cooling water passage which is one of the two cooling water passages through each of which cooling water having different temperatures flows, and which is the cooling water passage through which cooling water having a temperature lower than that of the high temperature system cooling water passage flows, and which passes through at least the intercooler;
   two communication passages which communicate the high temperature system cooling water passage and the low temperature system cooling water passage, one of the communication passages through which the cooling water flows from the high temperature system cooling water passage toward the low temperature system cooling water passage, and the other through which the cooling water flows from the low temperature system cooling water passage toward the high temperature system cooling water passage;
   valves which are provided for the communication passages respectively;
   a control unit configured to control the valves provided for the communication passages respectively so that a temperature of the gas flowing out from the intercooler becomes higher than a dew point temperature;
   a pump which discharges the cooling water in the low temperature system cooling water passage;
   another apparatus through which the low temperature system cooling water passage passes and which is different from the intercooler; and
   a valve which is provided for the low temperature system cooling water passage between the pump and the intercooler, wherein:
   the low temperature system cooling water passage is branched into a plurality of low temperature system cooling water passages on the downstream side from the pump,
   one of the branched low temperature system cooling water passages passes through the intercooler, and, the low temperature system cooling water passage, which is another one of the branched low temperature system cooling water passages and which is different from the low temperature system cooling water passage passing through the intercooler, passes through the another apparatus;
   the valve, which is provided for the low temperature system cooling water passage, is provided between a portion at which the low temperature system cooling water passage is branched and the intercooler; and
   if the cooling water is allowed to flow through the another apparatus, the control unit operates the pump, and the control unit controls at least either of the valves provided for the communication passages respectively or the valve provided for the low temperature system cooling water passage so that the temperature of the gas flowing out from the intercooler becomes higher than the dew point temperature.

2. The temperature control apparatus for the intercooler according to claim 1, wherein:
   the another apparatus is the turbocharger; and if it is requested to cool the turbocharger, the control unit operates the pump to flow the cooling water through the turbocharger.

3. The temperature control apparatus for the intercooler according to claim 2, wherein if a temperature of a predetermined member of the turbocharger is not less than a predetermined temperature, the control unit judges that it is requested to cool the turbocharger.

4. The temperature control apparatus for the intercooler according to claim 3, wherein the control unit judges whether or not it is requested to cool the turbocharger after stop of the internal combustion engine.

5. The temperature control apparatus for the intercooler according to claim 2, wherein the control unit judges, every time when a predetermined time elapses, that it is requested to cool the turbocharger.

6. The temperature control apparatus for the intercooler according to claim 2, wherein if it is requested to cool the turbocharger, the control unit decreases an opening degree of the valve provided for the low temperature system cooling water passage, as compared with if it is not requested to cool the turbocharger.

7. The temperature control apparatus for the intercooler according to claim 1, wherein if any knocking occurs in the internal combustion engine caused by the temperature of the gas flowing out from the intercooler higher than the dew point temperature, the control unit controls the temperature of the gas flowing out from the intercooler to the temperature equal to or lower than the dew point temperature within a range in which an amount of production of condensed water is not more than a prescribed amount.

* * * * *